3,346,564
N-HALOMETHYLCARBONYL-3-AZABICYCLO[3.2.2]NONANES
John J. D'Amico, Charleston, W. Va., assignor to Monsanto Company, a corporation of Delaware
No Drawing. Filed May 8, 1963, Ser. No. 278,997
2 Claims. (Cl. 260—239)

This invention relates to N-halomethylcarbonyl-3-azabicyclo[3.2.2]nonanes which are a new class of compounds.

As illustrative of the preparation, a mixture of 37.5 grams (0.3 mole) of 3-azabicyclo[3.2.2]nonane, 30.4 grams (0.3 mole) of triethylamine and 500 ml. of ethyl ether is prepared and 33.9 grams (0.3 mole) of chloracetyl chloride added dropwise at 25–30° C. The reactants are then stirred at 25–30° C. for 24 hours, 400 ml. of water then added and stirring continued for an additional 15 minutes. The product is filtered to remove a small amount of impurities, the ether layer separated, washed with water until neutral to litmus and dried over sodium sulfate. The ether is removed in vacuo at a maximum temperature of 30° C. The resulting solid is air-dried at 25–30° C. The product is obtained in 71% yield as a light yellow solid melting at 63–64° C. It is soluble in common organic solvents but insoluble in water. Analysis gives 7.13% nitrogen compared to 6.95% calculated for $C_{10}H_{16}ClNO$. Substituting an equal molecular quantity of bromoacetyl bromide or iodoacetyl bromide for chloracetyl chloride in the foregoing procedure yields N-bromomethylcarbonyl-3-azabicyclo[3.2.2]nonane and N-iodomethylcarbonyl-3-azabicyclo[3.2.2]nonane respectively.

The halogen in these compounds is quite reactive and consequently they are useful intermediates for organic synthesis. Moreover, they are extremely effective herbicides. They are preferably used as pre-emergence herbicides but are also toxic to foliage. The table below illustrates herbicidal activity. The toxicant, in this instance N-chloromethylcarbonyl-3-azabicyclo[3.2.2]nonane, is emulsified in water and the emulsion applied as a spray. In the foliage application the spray containing the concentration of active ingredient shown in the table is applied to the foliage of the plants and the effect recorded. In the pre-emergence tests the spray is applied to the ground of seeded plots before the grass or other plants emerge. The dosages are expressed in pounds per acre. The following phytotoxicity rating key is used:

|  | Contact | Pre-emergence |
|---|---|---|
| No phytotoxicity | 0 | 0 |
| Slight phytotoxicity | 1 | 1 |
| Moderate phytotoxicity | 2 | 2 |
| Severe phytotoxicity | 3 | 3 |
| Dead | 4 | |

TABLE I

| Plant | Contact 0.5% Conc. | Pre-emergent Dosage, lbs./acre | | | |
|---|---|---|---|---|---|
| | | 5 | 1 | 0.25 | 0.05 |
| Morning glory | 3 | 2 | 1 | 0 | 0 |
| Wild oat | 2 | 3 | 2 | 1 | 1 |
| Brome grass | 2 | 3 | 3 | 1 | 1 |
| Rye grass | 1 | 3 | 3 | 2 | 1 |
| Radish | 4 | 2 | 1 | 0 | 0 |
| Sugar beet | 1 | 3 | 3 | 1 | 0 |
| Cotton | | 1 | 1 | 1 | 0 |
| Corn | | 1 | 0 | 0 | 0 |
| Foxtail | 3 | 3 | 3 | 3 | 3 |
| Barnyard grass | | 3 | 3 | 3 | 3 |
| Crab grass | 3 | 3 | 3 | 3 | 2 |
| Pigweed | 4 | 3 | 3 | 2 | 0 |
| Soybean | 3 | 2 | 0 | 1 | 0 |
| Wild buckwheat | 3 | 2 | 1 | 0 | 0 |
| Tomato | 4 | 3 | 1 | 0 | 0 |
| Sorghum | 3 | 3 | 2 | 1 | 0 |
| Rice | | 3 | 3 | 1 | 0 |

From the above table it will be seen that this toxicant completely controls foxtail, barnyard grass and crab grass in pre-emergent application at dosages as low as one-fourth pound per acre and completely controls foxtail and barnyard grass at 0.05 pound per acre but is virtually non-toxic to cotton and corn at all concentrations. It will be further noted that the toxicant exerts considerable contact activity. Although chlorine is preferred for economic reasons, the corresponding bromine and iodine compounds are similarly effective herbicides.

Herbicidal compositions are prepared by admixing the active ingredient with a herbicidal adjuvant as carrier to provide formulations in liquid or solid form. Solid compositions in the form of dusts or granules are prepared by admixing the active component with finely divided solid carriers, as, for example, talc, clay, pyrophyllite, silica, and fuller's earth. Usually the toxicant will be present only in minor proportion in combination with the major proportion of carrier. Liquid compositions are prepared in the usual way by admixing the active ingredient with a liquid diluent. As pointed out above, the toxicants are soluble in common organic solvents. Petroleum fractions rich in aromatic hydrocarbons are desirable carriers.

Whether in the form of solids or liquids the herbicidal compositions may also include a surface active agent. This is advantageous for the compounding of emulsifiable concentrates. As surface active agents there may be employed soft or hard sodium or potassium soaps, alkylated aromatic sulfonates, such as sodium dodecylbenzenesulfonate, and dibutylammonium dodecylbenzenesulfonate, alkali metal salts of sulfated fatty alcohols, ethylene oxide condensation products of alkyl phenols, ethylene oxide condensation products of tall oil, and ethylene oxide condensation products of higher mercaptans. In general the composition applied as a herbicide will contain concentration of active ingredient within the range of 0.05 to 10% weight. For pre-emergence control amounts within the range of 0.01 to 100 pounds per acre will be satisfactory for most purposes.

It is intended to cover all changes and modifications of the examples of the invention herein chosen for purposes of disclosure which do not constitute departures from the spirit and scope of the invention.

What is claimed is:
1. N - halomethylcarbonyl-3-azabicyclo[3.2.2]nonane where the halogen is selected from the group consisting of chlorine, bromine and iodine.
2. N-chloromethylcarbonyl - 3 - azabicyclo[3.2.2]nonane.

References Cited
UNITED STATES PATENTS

| | | | |
|---|---|---|---|
| 2,684,962 | 7/1954 | Walter | 260—239 |
| 2,900,381 | 8/1959 | Thatcher | 260—239 |
| 2,970,048 | 1/1961 | Hamm et al. | 71—2.5 |
| 3,078,272 | 2/1963 | Mull | 260—249 |
| 3,092,483 | 6/1963 | Perkow | 71—2.5 |

ALTON D. ROLLINS, *Primary Examiner.*
J. O. THOMAS, J. S. LEVITT, *Examiners.*